July 31, 1962  D. J. CUPEDO  3,046,802
APPARATUS FOR HYDRAULICALLY OR PNEUMATICALLY OPERATING
A MEMBER, SUCH AS THE SLIDE OR THE VALVE
MEMBER OF A STOP VALVE
Filed Sept. 28, 1959  2 Sheets-Sheet 1
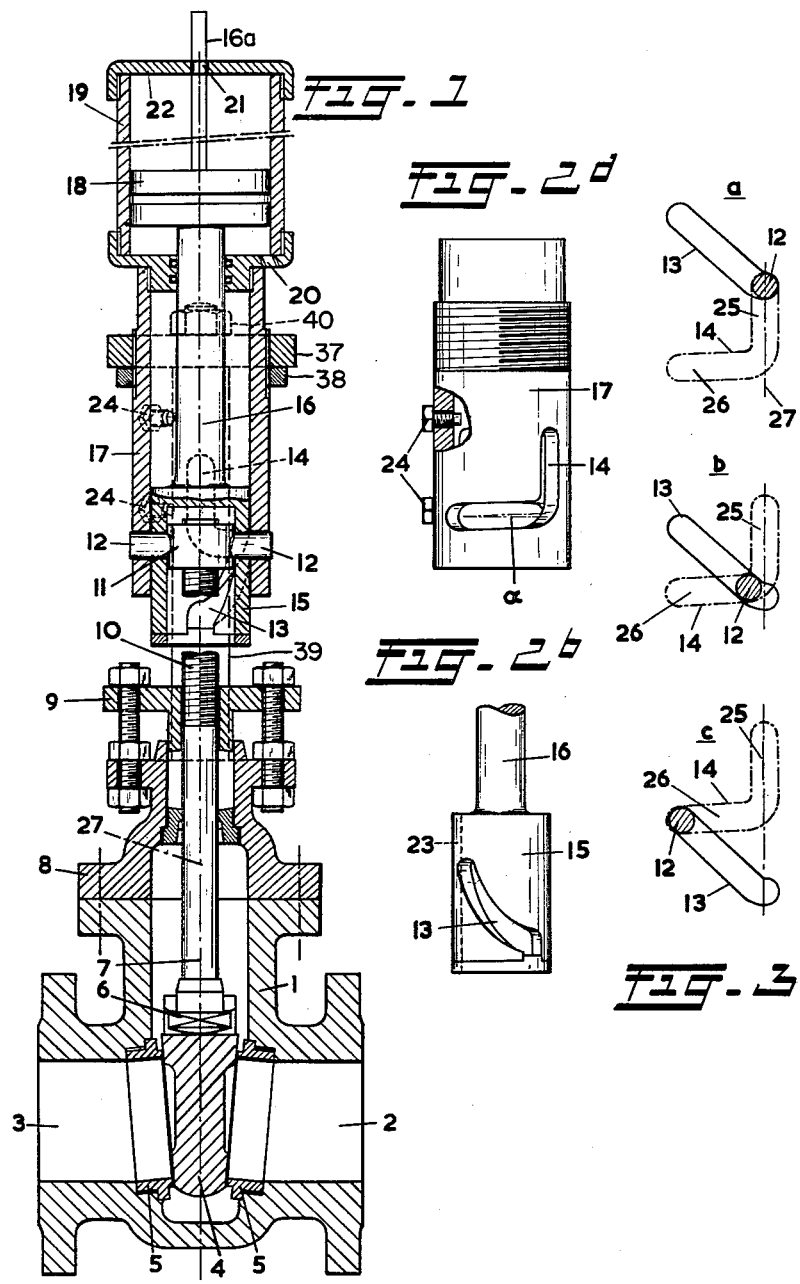
INVENTOR.
DOUWE J. CUPEDO
BY
Wenderoth, Lind & Ponack
Attys.

United States Patent Office 3,046,802
Patented July 31, 1962

3,046,802
APPARATUS FOR HYDRAULICALLY OR PNEUMATICALLY OPERATING A MEMBER, SUCH AS THE SLIDE OR THE VALVE MEMBER OF A STOP VALVE
Douwe Janse Cupedo, Koningin Wilhelminalaan 23, Leidschendam, Netherlands
Filed Sept. 28, 1959, Ser. No. 842,950
4 Claims. (Cl. 74—89)

This invention relates to an apparatus for hydraulically or pneumatically operating a member, such as the valve member of a stop valve, by means of an axially movable operating stem more particularly arranged in alignment with the spindle connected to said member.

The object of the invention is, inter alia, to have the forces required for operating the member, more particularly for closing and opening the valve member of a stop valve, so generated by the operating mechanism that the dimensions of the lifting cylinder may be as small as possible.

To achieve this end according to the invention the apparatus is so constructed that a body having at least one radial projection is arranged on the spindle, which projection is controlled by the edges of two slots, the one slot being provided in an element connected to said operating stem and the other slot being provided in a stationary element.

Thus the result is achieved that the force to be supplied by the hydraulic, pneumatic or electromagnetic operating mechanism in the one or the other direction amounts to only a fraction of the real force to be exerted on the spindle.

The apparatus according to the invention may be so constructed that the end of the operating stem turned towards said member is in the form of a cylindrical sleeve surrounding the body on the spindle, which body is of annular shape, one of the said slots being provided in the wall of said sleeve, said other slot being provided in the wall of a stationary cylindrical sleeve which is coaxial with the axially movable sleeve.

A very favourable effect is achieved when the apparatus is so constructed that the slot in the stationary sleeve is L-shaped and comprises an axial portion and a portion enclosing a small angle with the plane normal to the axis of the spindle, the slot in the other sleeve being substantially helical and enclosing a large angle with the said plane.

The invention will now be further elucidated with reference to the accompanying drawings showing by way of example a pneumatically operated stop valve. In the drawings:

FIGURE 1 is a longitudinal sectional view of the stop valve according to the invention;

FIGURES 2a and 2b are elevations of the outer and the inner cylindrical sleeve of the stop valve according to the invention;

Figure 4:
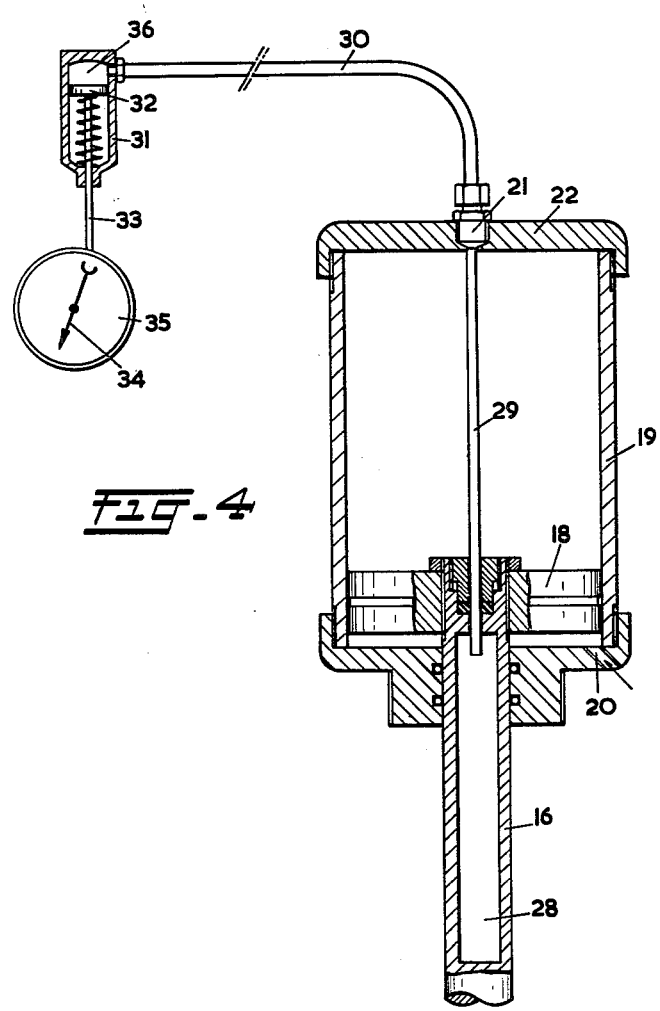

FIGURES 3a, b and c show the slots controlling the radial projection in three mutually different positions;

FIGURE 4 is a longitudinal sectional view of a position indicator.

In FIGURE 1 the reference numeral 1 designates the casing of the stop valve having inlet and outlet branches 2 and 3 respectively. At their sides facing the valve member 4 the branches 2 and 3 are provided with angular seats 5. In the embodiment shown the valve member 4 is secured to the screw spindle 7 by means of a hammer bolt construction 6, so that the screw spindle cannot rotate relative to the valve member. The screw spindle, however, might just as well have been screwed into the valve member.

Above the gland 9 which is of a conventional construction and which is arranged in the cover 8 of the stop valve the screw spindle 7 is provided with screw thread 10 on which an annular nut 11 carrying two radial projections 12 located diametrically opposite each other is threaded. Each of said projections 12 is inserted in two slots 13, 14, the one slot 13 being provided in a cylindrical sleeve 15 (see also FIGURES 2 and 3) which merges into an operating stem 16, while the other slot 14 is provided in a stationary cylindrical sleeve 17 coaxially surrounding the first mentioned sleeve. The outer sleeve 17 is screwed into a fixed member 37 and the sleeve is secured from rotation by a lock nut 38. There is shown only one of the two supporting columns 39 by means of which the member 37 is connected to the cover 8 of the stop valve body. The member 37 is connected to the columns 39 by means of nuts 40.

At its end remote from the sleeve 15 the operating stem 16 carries a double-acting piston 18 adapted to reciprocate in a lifting cylinder 19, the piston moving upwardly when the pressure fluid is admitted through the inlet opening 20 at the lower side of the cylinder whereas it will move downwardly when the pressure fluid is admitted through the inlet opening 21 at the upper side of the cylinder.

In the event of the operating mechanism failing it may be desirable to manually operate the stop valve. For that purpose the stem 16 may be provided with an extension 16a projecting through the cover 22 of the lifting cylinder.

The outer sleeve 17 is preferably secured to the cylinder 19, either by screw-thread or otherwise.

For a correct operation of the operating mechanism it is necessary to prevent a relative rotation between the sleeve 15 when it is axially displaced and the stationary sleeve 17. To achieve this end the sleeve 15 is provided with a straight axial groove 23 into which at least one of the two bolts 24 screwed into the sleeve 17 extends. Thus a relative axial movement but no relative rotational movement is possible between the two sleeves.

The manner in which the edges of the slots 13, 14 act on the projections 12 is as follows:

In FIGURE 3a the slots occupy the position they have when the valve member 4 is in the "valve-open" position. The projection 12 is located in the lower end of the slot 13 and in the upper end of the slot 14, which ends overlap. If the piston 18 is moved downwardly the sleeve 15 comprising the slot 13 will likewise be moved downwardly via the stem 16 from moving the valve member 4 to its valve closing position, and the lower end of slot 13 will take along the projection 12 through the axial portion 25 of slot 14 until the bend towards the substantially tangential portion 26 of slot 14 has been reached. In the position according to FIGURE 3b the valve member 4 is in its valve closing position, but it has not yet been pressed home, so that the fluid flowing through the stop valve may leak between the seat 5 and the valve member 4.

If now the valve member is to effect a perfect sealing it should be firmly pressed home. This is effected by the slots 13 and 14 continuing acting on the projection 12, by which action the edge of slot 13 will move the projection 12 up to the end of the tangential portion 26 of slot 14. As this tangential portion encloses an angle alpha of preferably 1° with the plane normal to the axis 27 of the stop valve, the valve member 4 will be forced down over a small distance during the tangential movement of the projection 12.

This effect is even augmented by the rotation of the nut 11 relative to the screw thread 10 on the screw spindle, provided that the angle of inclination of the screw thread has been correctly chosen. It stands to reason that the helix angle of screw thread 10 increased by the angle alpha should be such that the whole is self-locking.

The position indicator according to FIGURE 4 comprises a cylindrical cavity 28 in the stem 16 carrying the piston 18, which cavity has a length equal to the length of a thin tube 29 which at 21 has been threaded through the cylinder cover 22. Via a conduit 30 the tube 29 communicates with a small cylinder 31 containing a piston 32. The rod 33 of piston 32 actuates a pointer 34 which on a graduated scale 35 indicates the position of the valve member 4. The cavity 28, the tube 29, the conduit 30 and the space 36 above the piston 32 are entirely filled with liquid, e.g. oil.

If the piston 18 in cylinder 19 is lifted the stationary tube 29 will project farther into the cavity 28 so that the space available for the oil will become smaller and in view of the incompressibility of the oil it will flow through tube 29 and conduit 30, towards the space 36 and will cause the piston 32 to move downwardly in cylinder 31, whereby the pointer 34 will be turned.

It will be clear that without departing from the scope of the invention a great many variations are possible. Thus the slot mechanism may also be applied to a valve closing mechanism, a press, a water tight bulkhead or to some or other tool.

I claim:

1. An apparatus for hydraulically or pneumatically operating a member, such as the valve member of a stop valve, said member having a spindle connected thereto, said apparatus comprising a body having at least one radial projection thereon, said body being adapted to be threaded to the spindle on the member to be operated, an element around said body and adapted to be moved axially of said body and having at least one slot therein through which said radial projection extends, and a stationary element around said element and having at least one slot therein through which said radial arm also projects, said axially movable element being slidably and non-rotatably mounted in said stationary element, the edges of said two slots cooperating to act on said radial projection to move said body when said axially movable element is moved within said stationary element.

2. An apparatus as claimed in claim 1 in which said axially movable element is a cylindrical sleeve, and said body is an annular body, the slot in said axially movable element being in the wall in said sleeve, and said stationary element being a stationary cylindrical sleeve coaxial with said axially movable sleeve, and the slot in said stationary cylindrical sleeve being in the wall thereof.

3. An apparatus as claimed in claim 1 in which the slot in the stationary sleeve is L-shaped and has a portion extending axially of the sleeve and a portion extending around the periphery of the sleeve and at a small angle to a plane normal to the axis of the sleeve, the slot in the axially movable sleeve being helical and at a large angle to a plane normal to the axis of the sleeve.

4. An apparatus for hydraulically or pneumatically operating a member, such as the valve member of a stop valve, said member having a spindle connected thereto, said apparatus comprising a body having at least one radial projection thereon, said body being adapted to be threaded to the spindle on the member to be operated, an element around said body and having at least one slot therein through which said radial projection extends, an operating stem on said element for moving said element axially of said body, a double acting piston on said operating stem, a lifting cylinder in which said piston is reciprocable, the operating stem having an extension in the form of a rod passing through said cylinder and serving to manually operate the axially movable member, and a stationary element around said axially movable element and having at least one slot therein through which said radial arm also projects, said axially movable element being slidably and non-rotatably mounted in said stationary element, the edges of said two slots cooperating to act on said radial projection to move said body when said axially movable element is moved within said stationary element.

References Cited in the file of this patent

UNITED STATES PATENTS

| 951,318 | Kjerulff | Mar. 8, 1910 |
| 2,315,775 | D'Arcy | Apr. 6, 1943 |

FOREIGN PATENTS

| 468,849 | Germany | Nov. 23, 1928 |